US008099571B1

(12) United States Patent
Driscoll et al.

(10) Patent No.: US 8,099,571 B1
(45) Date of Patent: Jan. 17, 2012

(54) LOGICAL BLOCK REPLICATION WITH DEDUPLICATION

(75) Inventors: Alan S. Driscoll, Sunnyvale, CA (US); Damarugendra Mallaiah, Sunnyvale, CA (US); Gaurav Makkar, Sunnyvale, CA (US); Balaji Rao, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 755 days.

(21) Appl. No.: 12/187,305

(22) Filed: Aug. 6, 2008

(51) Int. Cl.
*G06F 12/00* (2006.01)

(52) U.S. Cl. ........ 711/162; 711/112; 711/114; 711/149; 711/209; 707/655; 707/659; 707/692; 707/693

(58) Field of Classification Search .................. 711/162, 711/112, 114, 149, 209; 707/655, 659, 692, 707/693
See application file for complete search history.

(56) References Cited

U.S. PATENT DOCUMENTS

| | | | |
|---|---|---|---|
| 5,504,861 A | 4/1996 | Crockett et al. |
| 5,592,618 A | 1/1997 | Micka et al. |
| 5,657,440 A | 8/1997 | Micka et al. |
| 5,682,513 A | 10/1997 | Candelaria et al. |
| 5,819,292 A | 10/1998 | Hitz et al. |
| 6,144,999 A | 11/2000 | Khalidi et al. |
| 6,502,205 B1 | 12/2002 | Yanai et al. |
| 6,539,396 B1 | 3/2003 | Bowman-Amuah |
| 6,711,693 B1 | 3/2004 | Golden et al. |
| 6,993,539 B2 | 1/2006 | Federwisch et al. |
| 7,028,147 B2 | 4/2006 | Wu et al. |
| 7,136,882 B2 | 11/2006 | Collins et al. |
| 7,152,077 B2 | 12/2006 | Veitch et al. |
| 7,152,120 B2 | 12/2006 | Yamagami |
| 7,203,732 B2 | 4/2007 | McCabe et al. |
| 7,237,076 B2 | 6/2007 | Nakano et al. |
| 7,243,115 B2 | 7/2007 | Manley et al. |
| 7,302,634 B2 | 11/2007 | Lucovsky et al. |
| 7,325,109 B1 | 1/2008 | Muppalaneni et al. |
| 7,467,265 B1 | 12/2008 | Tawri et al. |

(Continued)

FOREIGN PATENT DOCUMENTS

EP 1617330 A2 1/2006

OTHER PUBLICATIONS

Freeman et al., "Configuring NetApp Deduplication with LUN's," http://communities.netapp.com/docs/DOC-1192, pp. 1-16, May 22, 2008.*

(Continued)

*Primary Examiner* — Stephen Elmore
(74) *Attorney, Agent, or Firm* — Perkins Coie LLP

(57) ABSTRACT

Bandwidth consumption between a data replication source and destination and storage consumption at the destination are reduced, when logical block mirroring is used with source deduplication, by eliminating repeated transmission of data blocks from source to destination. A reference is created for each data block at the source, the reference being unique within a storage aggregate of the source. During a mirror update, the source initially sends only the references of modified data blocks to the destination. The destination compares those references against a data structure to determine whether the destination already has any of those data blocks stored. If the destination determines that it already has a data block stored, it does not request or receive that data block again from the source. Only if the destination determines that it has not yet received the referenced data block does it request and receive that data block from the source.

28 Claims, 7 Drawing Sheets

U.S. PATENT DOCUMENTS

| | | | |
|---|---|---|---|
| 7,539,976 | B1 | 5/2009 | Ousterhout et al. |
| 7,562,077 | B2 | 7/2009 | Bisson et al. |
| 7,571,268 | B2 | 8/2009 | Kern et al. |
| 7,606,841 | B1 | 10/2009 | Ranade |
| 7,624,109 | B2 | 11/2009 | Testardi |
| 7,653,668 | B1 | 1/2010 | Shelat et al. |
| 7,814,074 | B2 * | 10/2010 | Anglin et al. ............ 707/692 |
| 7,818,495 | B2 * | 10/2010 | Tanaka et al. ............ 711/103 |
| 7,885,923 | B1 | 2/2011 | Tawri et al. |
| 7,925,629 | B2 | 4/2011 | Webman et al. |
| 7,937,371 | B2 * | 5/2011 | Bates et al. ............ 707/661 |
| 7,984,022 | B2 * | 7/2011 | Cannon et al. ............ 707/664 |
| 7,996,371 | B1 * | 8/2011 | Deshmukh ............ 707/692 |
| 2002/0039370 | A1 | 4/2002 | Elliot |
| 2003/0018878 | A1 | 1/2003 | Dorward et al. |
| 2003/0065873 | A1 | 4/2003 | Collins et al. |
| 2003/0101223 | A1 | 5/2003 | Pace et al. |
| 2003/0177154 | A1 | 9/2003 | Vrancic |
| 2003/0182313 | A1 | 9/2003 | Federwisch et al. |
| 2003/0182325 | A1 | 9/2003 | Manley et al. |
| 2003/0204692 | A1 | 10/2003 | Tamer et al. |
| 2004/0039774 | A1 | 2/2004 | Xu et al. |
| 2004/0139367 | A1 | 7/2004 | Boyd et al. |
| 2004/0205372 | A1 | 10/2004 | Moser et al. |
| 2004/0250029 | A1 | 12/2004 | Ji et al. |
| 2004/0260736 | A1 | 12/2004 | Kern et al. |
| 2005/0015413 | A1 | 1/2005 | Teodosiu et al. |
| 2005/0050115 | A1 | 3/2005 | Kekre |
| 2005/0055357 | A1 | 3/2005 | Campbell |
| 2005/0071708 | A1 | 3/2005 | Bartfai et al. |
| 2005/0097260 | A1 | 5/2005 | McGovern et al. |
| 2005/0144202 | A1 | 6/2005 | Chen |
| 2005/0154786 | A1 | 7/2005 | Shackelford |
| 2005/0278382 | A1 | 12/2005 | LaRocca et al. |
| 2006/0006918 | A1 | 1/2006 | Saint-Laurent |
| 2006/0015507 | A1 | 1/2006 | Butterworth et al. |
| 2006/0059322 | A1 | 3/2006 | Poston |
| 2006/0095480 | A1 | 5/2006 | Vaughn et al. |
| 2006/0106895 | A1 | 5/2006 | Vaughn et al. |
| 2006/0173985 | A1 | 8/2006 | Moore |
| 2006/0200761 | A1 | 9/2006 | Judd et al. |
| 2006/0271727 | A1 * | 11/2006 | Wang et al. ............ 711/103 |
| 2007/0011281 | A1 | 1/2007 | Jhoney et al. |
| 2007/0022264 | A1 | 1/2007 | Bromling et al. |
| 2007/0094466 | A1 | 4/2007 | Sharma et al. |
| 2007/0118687 | A1 | 5/2007 | McGovern et al. |
| 2007/0165549 | A1 | 7/2007 | Surek et al. |
| 2007/0168633 | A1 | 7/2007 | English et al. |
| 2007/0174687 | A1 | 7/2007 | Graham et al. |
| 2007/0185937 | A1 | 8/2007 | Prahlad et al. |
| 2007/0185938 | A1 | 8/2007 | Prahlad et al. |
| 2007/0239950 | A1 | 10/2007 | Kern et al. |
| 2007/0288708 | A1 | 12/2007 | Saha et al. |
| 2008/0077762 | A1 | 3/2008 | Scott et al. |
| 2008/0162594 | A1 | 7/2008 | Poston |
| 2008/0243951 | A1 | 10/2008 | Webman et al. |
| 2008/0243952 | A1 | 10/2008 | Webman et al. |
| 2008/0288646 | A1 | 11/2008 | Hasha et al. |
| 2010/0169275 | A1 | 7/2010 | Chen et al. |
| 2010/0250497 | A1 | 9/2010 | Redlich et al. |

OTHER PUBLICATIONS

Chutani, et al. "The Episode File System". Proc.1992 Winter USENIX Conference, pp. 43-60 (1992).

Howard, et al., "Scale and Performance in a Distributed File System", ACM Transactions on Computer Systems. vol. 6, No. 1, Feb. 1988. pp. 51-81.

Mills, D.L., "Network Time Protocol (Version 3) Specification, Implementation and Analysis," Network Working Group, XP002935527, Mar. 1, 1992, pp. 1-v11 and 1-133.

Bob Sidebotham, "Volumes: The Andrew File System Data Structuring Primitive", EUUG Conference Proceedings Manchester, United Kingdom, pp. 1-8, Autumn 1986.

International Search Report PCT/US2008/003554 Dated Aug. 26, 2008, pp. 1-3.

Written Opinion PCT/US2008/003554 Dated Aug. 26, 2008, pp. 1-6.

International Search Report PCT/US2008/003612 Dated Nov. 5, 2008, pp. 1-3.

Written Opinion PCT/US2008/003612 Dated Nov. 5, 2008, pp. 1-8.

International Search Report PCT/US2008/003692 Dated Nov. 5, 2008, pp. 1-3.

Written Opinion PCT/US2008/003692 Dated Nov. 5, 2008, pp. 1-8.

Co-pending U.S. Appl. No. 12/433,871 of Leverett, B., filed Apr. 30, 2009.

Co-pending U.S. Appl. No. 12/713,744 of Leverett, B., et al., filed Feb. 26, 2010.

Co-pending U.S. Appl. No. 12/559,483 of Shah, D.K., et al., filed Sep. 14, 2009.

Co-pending U.S. Appl. No. 12/610,234 of Condict, M.N., filed Oct. 30, 2009.

Co-pending U.S. Appl. No. 12/610,231 of Condict, M.N., et al., filed Oct. 30, 2009.

Co-pending U.S. Appl. No. 11/692,668 of Webman, E., filed Mar. 28, 2007.

Co-pending U.S. Appl. No. 11/692,683 of Webman, E., et al., filed Mar. 28, 2007.

Co-pending U.S. Appl. No. 11/692,659 of Webman, E., et al., filed Mar. 28, 2007.

Non-Final Office Action Mailed Apr. 1, 2009 in Co-Pending U.S. Appl. No. 11/692,668 of Webman, E., filed Mar. 28, 2007.

Final Office Action Mailed Aug. 27, 2009 in Co-Pending U.S. Appl. No. 11/692,668 of Webman, E., filed Mar. 28, 2007.

Non-Final Office Action Mailed Mar. 1, 2010 in Co-Pending U.S. Appl. No. 11/692,668 of Webman, E., filed Mar. 28, 2007.

Notice of Allowance Mailed Jul. 22, 2010 in Co-Pending U.S. Appl. No. 11/692,668 of Webman, E., filed Mar. 28, 2007.

Non-Final Office Action Mailed Jul. 21, 2010 in Co-Pending U.S. Appl. No. 11/692,683 of Webman, E., et al., filed Mar. 28, 2007.

Non-Final Office Action Mailed Sep. 10, 2010 in Co-Pending U.S. Appl. No. 11/692,668 of Webman, E., filed Mar. 28, 2007.

Notice of Allowance Mailed Aug. 26, 2011 in Co-Pending U.S. Appl. No. 11/692,659 of Webman, E., et al., filed Mar. 28, 2007.

Advisory Action Mailed Aug. 1, 2011 in Co-Pending U.S. Appl. No. 11/692,659 of Webman, E., et al., filed Mar. 28, 2007.

Final Office Action Mailed Apr. 26, 2011 in Co-Pending U.S. Appl. No. 11/692,659 of Webman, E., et al., filed Mar. 28, 2007.

Non-Final Office Action Mailed Oct. 27, 2010 in Co-Pending U.S. Appl. No. 11/692,659 of Webman, E., et al., filed Mar. 28, 2007.

Final Office Action Mailed Nov. 9, 2010 in Co-Pending U.S. Appl. No. 11/692,683 of Webman, E., et al., filed Mar. 28, 2007.

Non-Final Office Action Mailed Sep. 15, 2011 in Co-Pending U.S. Appl. No. 12/713,744 of Leverett, B., et al., filed Feb. 26, 2010.

Non-Final Office Action Mailed Jul. 27, 2011 in Co-Pending U.S. Appl. No. 12/433,871 of Leverett, B., filed Apr. 30, 2009.

Notice of Allowance Mailed Dec. 23, 2010 in Co-Pending U.S. Appl. No. 11/692,668 of Webman, E., filed Mar. 28, 2007.

Non-Final Office Action Mailed Oct. 19, 2011 in Co-Pending U.S. Appl. No. 12/569,483 of Shah, D.K., et al., filed Sep. 14, 2009.

Non-Final Office Action Mailed Oct. 27, 2011 in Co-Pending U.S. Appl. No. 12/610,231 of Condict, M.N., et al., filed Oct. 30, 2009.

* cited by examiner

LOGICAL BLOCK REPLICATION WITH DEDUPLICATION

FIELD OF THE INVENTION

At least one embodiment of the present invention pertains to data storage systems, and more particularly, to a technique for performing logical replication of data blocks with deduplication.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in a network attached storage (NAS) environment. Other storage controllers are designed to service block-level requests from hosts, as with storage controllers used in a storage area network (SAN) environment. Still other storage controllers are capable of servicing both file-level requests and block-level requests, as is the case with certain storage controllers made by NetApp, Inc. of Sunnyvale, Calif.

One common use of storage controllers is data mirroring. Mirroring is a technique for backing up data, where a given data set at a source is replicated exactly at a destination, which is often geographically remote from the source. The replica data set created at the destination is called a "mirror" of the original data set. Typically mirroring involves the use of at least two storage controllers, e.g., one at the source and another at the destination, which communicate with each other through a computer network or other type of data interconnect to create the mirror.

Mirroring can be done at a physical block level or at a logical block level. To understand the difference, consider that each data block in a given set of data, such as a file, can be represented by both a physical block, pointed to by a corresponding physical block pointer, and a logical block pointed to by a corresponding logical block pointer. These two types of blocks are actually the same data block. However, the physical block pointer indicates the actual physical location of the data block on a storage medium, whereas the logical block pointer indicates the logical position of the data block within the data set (e.g., a file) relative to other data blocks.

When mirroring is done at the physical block level, the mirroring process creates a mirror that has the identical structure of physical block pointers as the original data set. When mirroring is done at the logical block level, the mirror has the identical structure of logical block pointers as the original data set but may (and typically does) have a different structure of physical block pointers than the original data set. These two different types of mirroring have different implications and consequences under certain conditions, as explained below.

Before considering this further, note that in a large-scale storage system, such as an enterprise storage network, it is common for large amounts of data, such as certain data blocks, to be duplicated and stored in multiple places in the storage system. Sometimes this duplication is intentional, but often it is an incidental result of normal operation of the system. As such, a given block of data can be part of two or more different files. Data duplication generally is not desirable from the standpoint that storage of the same data in multiple places consumes extra storage space, which is a limited resource.

Consequently, in many large-scale storage systems, storage controllers have the ability to "deduplicate" data, which is the ability to identify and remove duplicate data blocks. In one known approach to deduplication, any extra (duplicate) copies of a given data block are deleted (or, more precisely, marked as free), and any references (e.g., pointers) to those duplicate blocks are modified to refer to the one remaining instance of that data block. A result of this process is that a given data block may end up being shared by two or more files (or other types of logical data containers).

Deduplication is typically done at the physical block level, not at the logical block level. As a result, two different logical data blocks in two different files may correspond to (share) the same physical data block. The sharing of logical data blocks due to deduplication can cause inefficiencies, however, if deduplication is employed with logical mirroring.

In logical mirroring, a mirroring application at the source from time to time identifies logical data blocks that have been modified and sends those modified logical data blocks to the destination as part of a mirror update process. However, the mirroring application reads logical data blocks, not physical data blocks, and is therefore unaware of the effects of deduplication at the source. Consequently, two logical data blocks that have been modified will be sent by the mirroring application to the destination even if they correspond to (share) the same physical data block. This results in the same data being sent more than once over the connection from the source to the destination during a mirror update, resulting in unnecessary extra bandwidth consumption. Furthermore, if the destination does not also perform deduplication before committing the update to storage, the duplicate blocks will be written to storage media at the destination, resulting in unnecessary use of storage space at the destination. Moreover, while deduplication can be performed at the destination, doing so undesirably consumes processing resources.

One known approach to logical mirroring is to place a self-contained device between the source and the destination, to perform deduplication. This device identifies any duplicate data blocks that are being sent over the connection from the source to the destination and essentially filters them out, so that they do not reach the destination. One drawback of this approach, however, is that while duplicate data blocks do not reach the destination, they are still read from storage and transmitted by the source onto the connection between the source and the destination. This is because the logical mirroring application at the source still reads only logical data blocks; consequently, any physical data blocks that are shared by two or more logical data blocks will still be read by the mirroring application and transmitted onto the connection to the destination. This results in unnecessary read activity at the source, which consumes processing resources and can reduce performance.

Also, in the above-mentioned approach the self-contained device has to analyze the content of each and every data block that the source sends over the connection to the destination, to determine the duplicate blocks. The system cannot leverage any duplication information that may already be present at the source; consequently, it ends up using more CPU time, power, etc.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
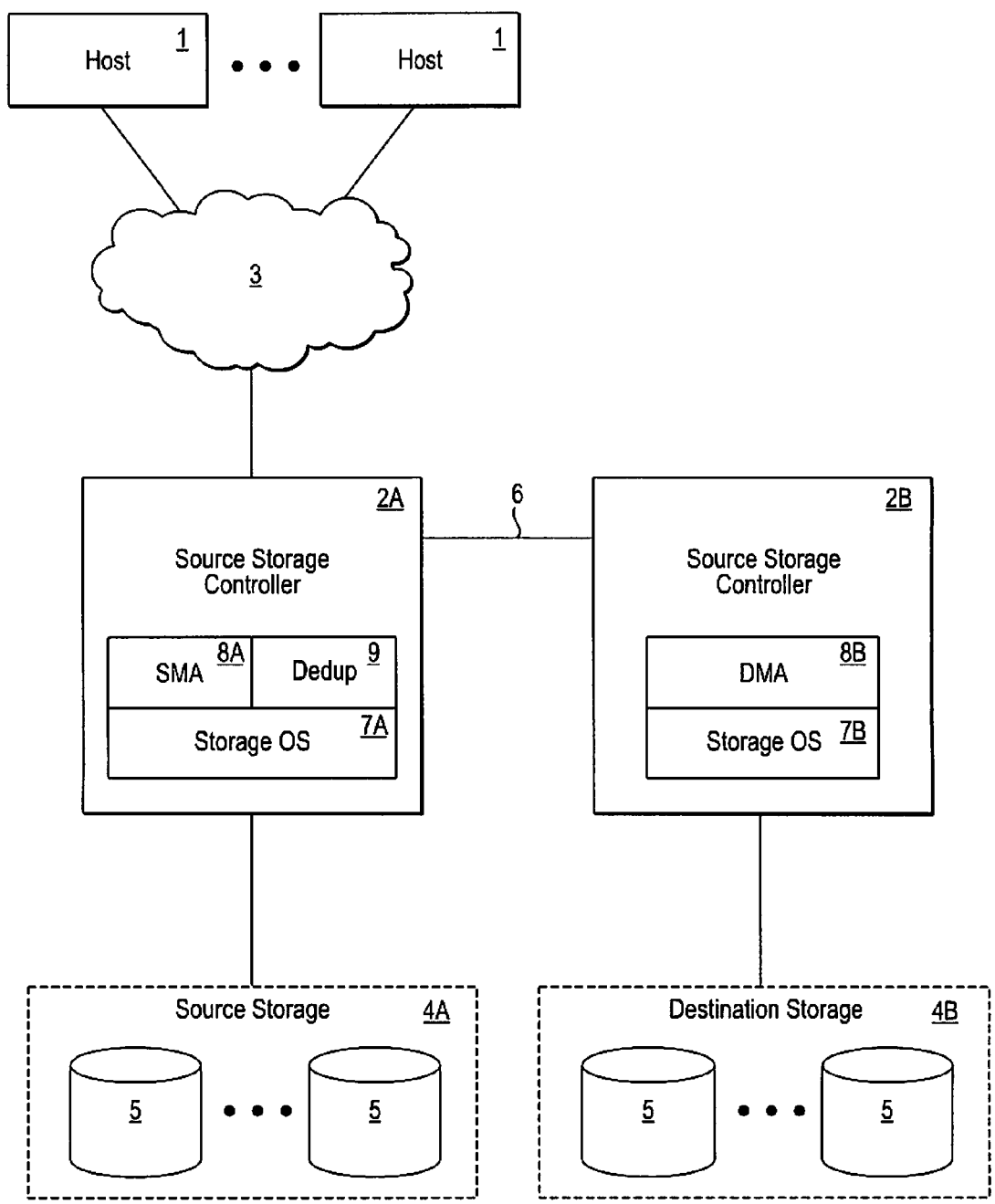
FIG. 1, which shows a network storage system in which the technique introduced here can be implemented.

A method and apparatus for performing deduplication in conjunction with logical mirroring are described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here reduces consumption of bandwidth between a data replication source and destination and reduces consumption of storage space at the destination, when logical block mirroring is used with source-based deduplication, by eliminating repeated transmission of data blocks (i.e., duplicates) from the source to destination. Similarly, the technique reduces consumption of processing power at the destination by avoiding the need to perform deduplication at the destination.

As described in greater detail below, the technique allows replication (e.g., mirroring) of data blocks from a source storage system to a destination storage system at a logical block level, where deduplication is performed only at the source storage system, without transmitting any data block, including physical data blocks shared by multiple logical data blocks, more than once from the source storage system to the destination storage system. This can be accomplished in part by creating a reference for each data block at the source storage system, where the reference is unique within the context of a storage aggregate of the source storage system. Then, during a mirror update (or other similar replication operation), the source storage system initially sends only the references of modified data blocks to the destination storage system. The destination storage system compares those references against a local data structure, to determine whether the destination storage system already has any of those data blocks stored.

If the destination storage system determines that it already has a data block stored, it does not request or receive that data block again from the source storage system. Only if the destination storage system determines that it has not yet received the referenced data block does it request and receive that data block from the source storage system. Hence, no data block is sent more than once from the source storage system to the destination storage system for purposes of data replication (e.g., for purposes of creating or updating a mirror).

In certain embodiments, the unique reference for each data block includes a physical volume block number (PVBN) of the data block or a virtual volume block number (VVBN) of the data block, which (in either case) is independent of the logical block number(s) of the data block. PVBNs and VVBNs are described further below. In certain embodiments, the above-mentioned data structure maintained by the destination storage system includes a mapping of source storage system PVBNs (or VVBNs) to corresponding destination storage system PVBNs (or VVBNs).

Refer now to FIG. 1, which shows a network storage system in which one can implement the technique being introduced here. In FIG. 1, a source storage controller 2A is coupled to a source storage subsystem 4A and to a set of hosts 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the hosts 1 may be, for example, a conventional personal computer (PC), server-class computer, workstation, handheld computing/communication device, or the like.

Storage of data in the source storage subsystem 4A is managed by storage controller 2A. Source storage controller 2A and source storage subsystem 4A are collectively referred to as the source storage system. The storage controller 2 receives and responds to various read and write requests from the hosts 1, directed to data stored in or to be stored in storage subsystem 4A. Storage subsystem 4A includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4A can be organized as a Redundant Array of Inexpensive Disks (RAID), in which case the storage controller 2 accesses the storage subsystem 4 using a conventional RAID algorithm for redundancy.

The source storage controller 2A is connected to a destination storage controller 2B through an interconnect 6, for purposes of mirroring data. Although illustrated as a direct connection, the interconnect 6 may include one or more intervening devices an/or may include one or more networks. The source storage controller 2A includes a storage operating system 7A, which is responsible for managing storage of data in the source storage subsystem 4A, servicing requests from hosts 1, and performing various other types of storage related operations. Logically on top of the storage operating system 7A is a source mirroring application (SMA) 8A and a deduplication application 9. The SMA 8A operates in cooperation with a remote destination mirroring application (DMA) 8B, described below, to perform logical mirroring of data stored in the source storage subsystem 4A. Note that in other embodiments, one or both of the SMA 8A and the deduplication application 9 may be implemented as elements of the storage operating system 7A.

Similarly, the destination storage controller 2B includes a storage operating system 7B to control storage related operations on the destination storage controller 2B, as well as a DMA 8B logically on top of the storage operating system 7B. In other embodiments, the DMA 8B may be implemented as an element of storage operating system 7B. The destination storage controller 2B and the destination storage subsystem 4B are collectively referred to as the destination storage system.

The DMA 8B works in cooperation with the SMA 8A to mirror data from the source storage system to the destination storage system. Note that the destination storage controller 2B does not require any deduplication application when it is used in conjunction with the technique introduced here.

In certain embodiments, the storage operating systems 7A and 7B, mirroring applications 8A and 8B, and deduplication application 9 are all implemented in the form of software. In other embodiments, however, any one or more of these elements may be implemented in pure hardware, e.g., specially-designed dedicated circuitry.

Storage controllers 2A and 2B each may be, for example, a storage server which provides file-level data access services to hosts, such as commonly done in a NAS environment, or block-level data access services such as commonly done in a SAN environment, or it may be capable of providing both file-level and block-level data access services to hosts. Further, although the storage controller 2 is illustrated as a single unit in FIG. 1, it can have a distributed architecture. For example, the storage controller 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

Figure 2:
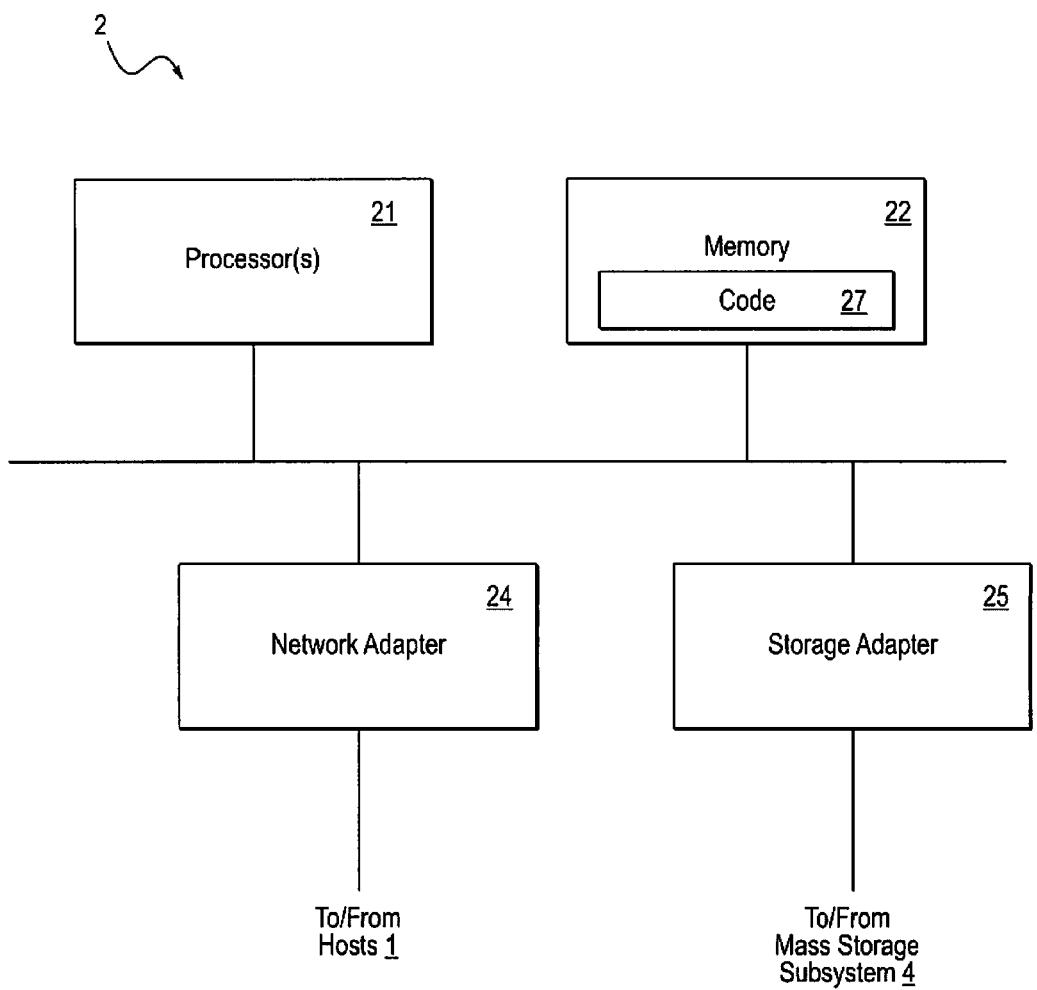
FIG. 2 is a high-level block diagram showing an example of the architecture of a storage system.

FIG. 2 is a high-level block diagram showing an example of the architecture of a storage controller 2, such as storage controller 2A or 2B. The storage controller 2 includes one or more processors 21 and memory 22 coupled to an interconnect 23. The interconnect 23 shown in FIG. 2 is an abstraction that represents any one or more separate physical buses, point-to-point connections, or both connected by appropriate bridges, adapters, or controllers. The interconnect 23, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 21 is/are the central processing unit (CPU) of the storage controller 2 and, thus, control the overall operation of the storage controller 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 22 is or includes the main memory of the storage controller 2. The memory 22 represents any form of random access memory (RAM), read-only memory (ROM), flash memory, or the like, or a combination of such devices. In use, the memory 22 may contain, among other things, code 27 embodying at least a portion of a storage operating system of the storage controller 2. Code 27 can also include a mirroring application and/or deduplication application.

Also connected to the processor(s) 21 through the interconnect 23 are a network adapter 24 and a storage adapter 25. The network adapter 24 provides the storage controller 2 with the ability to communicate with remote devices, such as hosts 1, over the interconnect 3 and may be, for example, an Ethernet adapter or Fibre Channel adapter. The storage adapter 25 allows the storage controller 2 to access a storage subsystem, such as storage subsystem 4A or 4B, and may be, for example, a Fibre Channel adapter or SCSI adapter.

Figure 3:
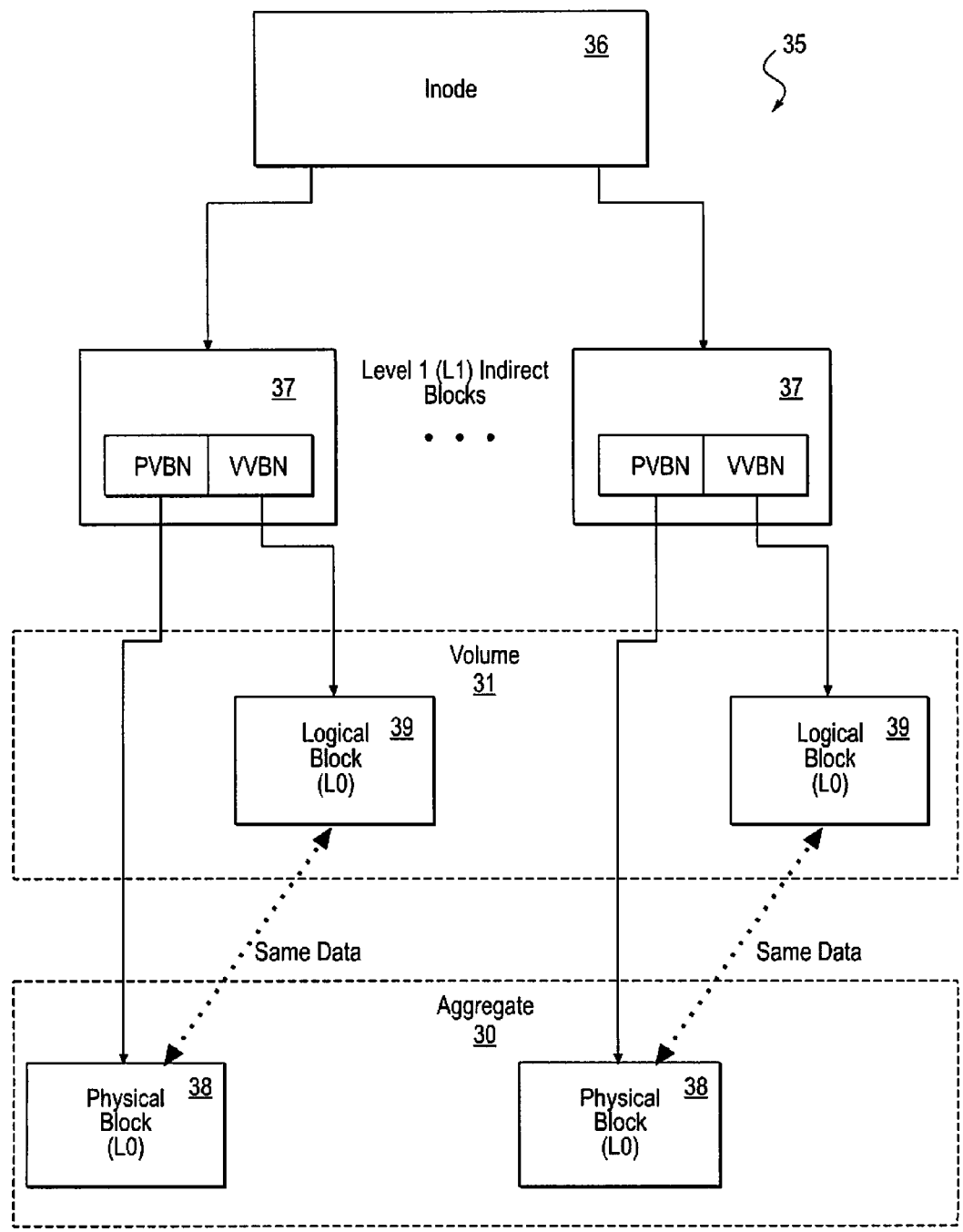
FIG. 3 shows an example of a buffer tree.
Figure 4:
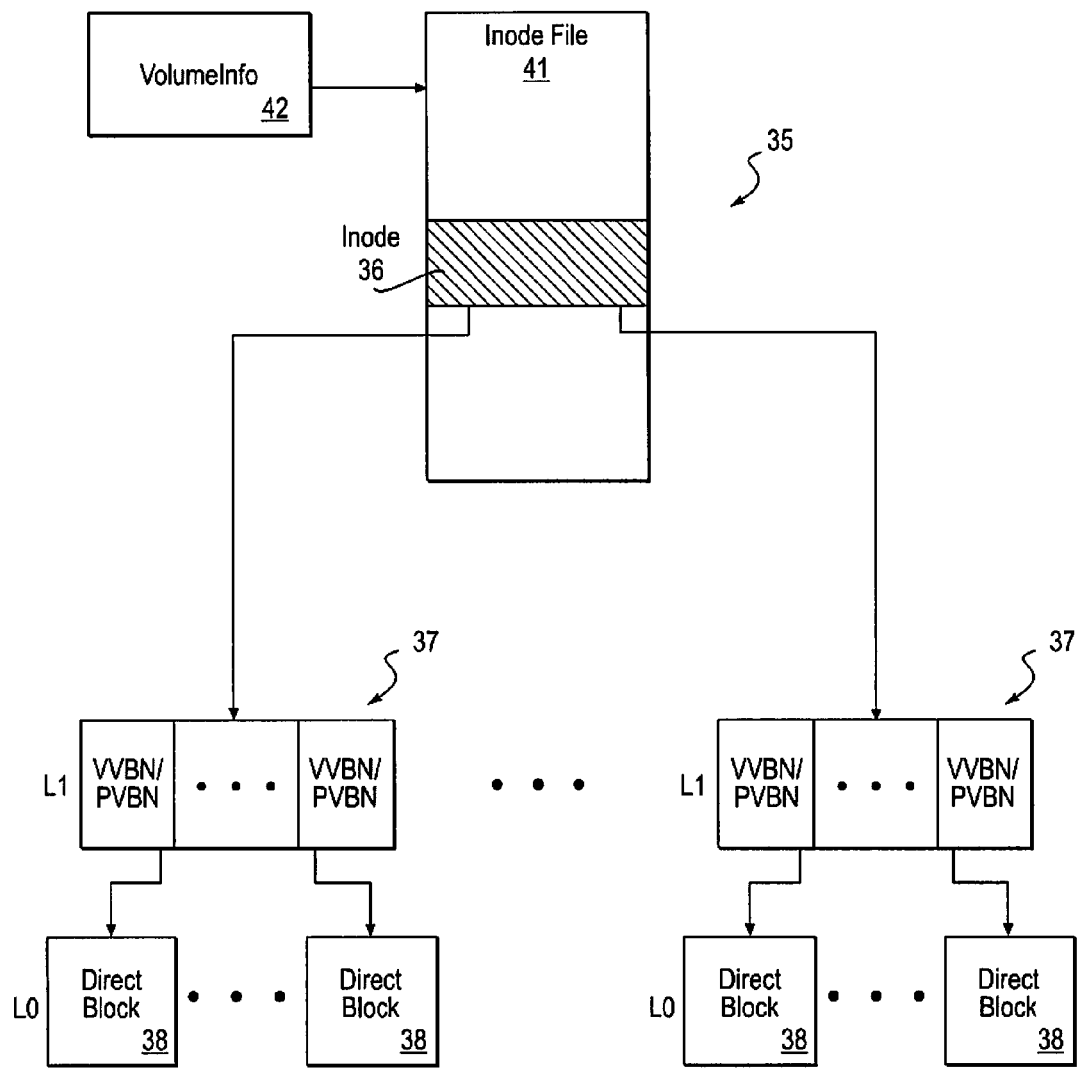
FIG. 4 shows the relationship between inodes, an inode file and a buffer tree.

It is useful now to consider how data can be structured and organized by storage controllers 2A and 2B in certain embodiments. Reference is now made to FIGS. 3 and 4 in this regard.

In at least one embodiment, data is stored in the form of volumes, where each volume contains one or more directories, subdirectories, quota trees (qtrees) and/or files. A qtree is special type of directory that has a storage space limit or quota associated with it. The term "aggregate" is used to refer to a pool of storage, which combines one or more physical mass storage devices (e.g., disks) or parts thereof into a single logical storage object. An aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories, qtrees, files and/or files.

In certain embodiments, an aggregate uses a PVBN space that defines the storage space of blocks provided by the storage devices of the physical volume, and each volume uses a VVBN space to organize those blocks into one or more higher level objects, such as directories, subdirectories, qtrees and files. A PVBN, therefore, is an address of a physical block in the aggregate. A VVBN is an address of a block in a volume (the same block as referenced by the corresponding PVBN), i.e., the offset of the block within a file that represents the volume. Knowledge of all of the VVBNs and PVBNs is maintained by the storage operating system in each storage controller. Each VVBN space is an independent set of values that corresponds to locations within a directory, qtree or file, which are translated by the storage access layer 34 to device block numbers (DBNs) on a physical storage device.

Each volume can be a separate file system that is "mingled" with other volumes onto a common set of storage in the aggregate by the storage operating system. A RAID layer in the storage operating system builds a RAID topology structure for the aggregate that guides each volume when performing write allocation. The RAID layer also presents a PVBN-to-DBN mapping to the storage manager 21.

In addition, the storage operating system maintains a logical block number for each data block. If the storage controller stores data in the form of files, the logical block numbers are called file block numbers (FBNs). Each FBN indicates the logical position of the block within a file, relative to other blocks in the file, i.e., the offset of the block within the file. For example, FBN 0 represents the first logical block in the file, FBN 1 represents the second logical block in the file, and so forth. Note that the PVBN and VVBN of a data block are independent of the FBN(s) that refer to that block.

In certain embodiments, each file is represented in a storage controller on the form of a hierarchical structure called a "buffer tree". A buffer tree is a hierarchical structure which used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/ or to the direct blocks (called "L0 blocks") of the file. All of the data in the file is stored only at the lowest level (L0) blocks.

The root of a buffer tree is the "inode" of the file. An inode is a metadata container that is used to store metadata about the file, such as ownership, access permissions, file size, file type, and pointers to the highest level of indirect blocks for the file.

Each file has its own inode. The inode is stored in a separate inode file, which may itself be structured as a buffer tree.

FIG. 3 shows an example of a buffer tree 35 for a file. The file is assigned an inode 36, which references Level 1 (L1) indirect blocks 37. Each indirect block 37 stores at least one PVBN and a corresponding VVBN for each PVBN. There is a one-to-one mapping between each VVBN and PVBN. Note that a VVBN is a logical block number in a volume, which is a virtual number for addressing; but there is only one copy of the L0 data block physically stored. Also, to simplify description, only one PVBN-VVBN pair is shown in each indirect block 37 in FIG. 3; however, an actual implementation would likely include multiple/many PVBN-VVBN pairs in each indirect block 37. Each PVBN references a physical block 38 in a storage device (i.e., in the aggregate 30) and the corresponding VVBN represents the corresponding logical block 39 in a file that represents the volume (called the "container file") 31. Physical blocks 38 and logical blocks 39 are actually the same L0 data for any particular PVBN-VVBN pair, however, they are accessed in different ways: The PVBN is accessed directly in the aggregate 30, while the VVBN is accessed virtually via the volume container file 31.

Referring now to FIG. 4, for each volume managed by the storage server 2, the inodes of the files and directories in that volume are stored in a separate inode file 41. A separate inode file 41 is maintained for each volume. Each inode 36 in an inode file 41 is the root of the buffer tree 35 of a corresponding file. The location of the inode file 41 for each volume is stored in a Volume Information ("VolumeInfo") block 42 associated with that volume. The VolumeInfo block 42 is a metadata container that contains metadata that applies to the volume as a whole. Examples of such metadata include, for example, the volume's name, type, size, any space guarantees to apply to the volume, and the VVBN of the inode file of the volume.

In at least one conventional asynchronous data mirroring technique, the SMA first generates a persistent point-in-time image ("snapshot") of a data set to be replicated at the source (e.g., a qtree), and then sends that snapshot to the DMA; this data is referred to as the baseline, or baseline snapshot. Subsequently, from time to time, the SMA executes a mirror update process (which may be at the request of the DMA). To do so, the SMA takes an update snapshot of the data set, identifies any data blocks (FBNs) that have been modified since the last snapshot, whichever is later, and sends those changed blocks to the destination.

Figure 5A:
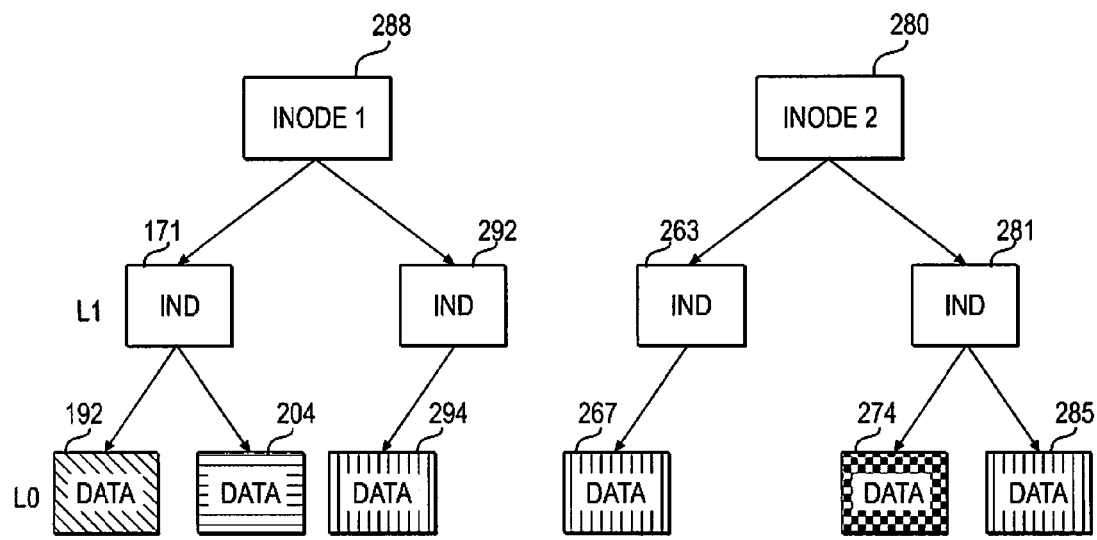
FIGS. 5A and 5B illustrate an example of two buffer trees before and after deduplication of data blocks, respectively.
Figure 5B:
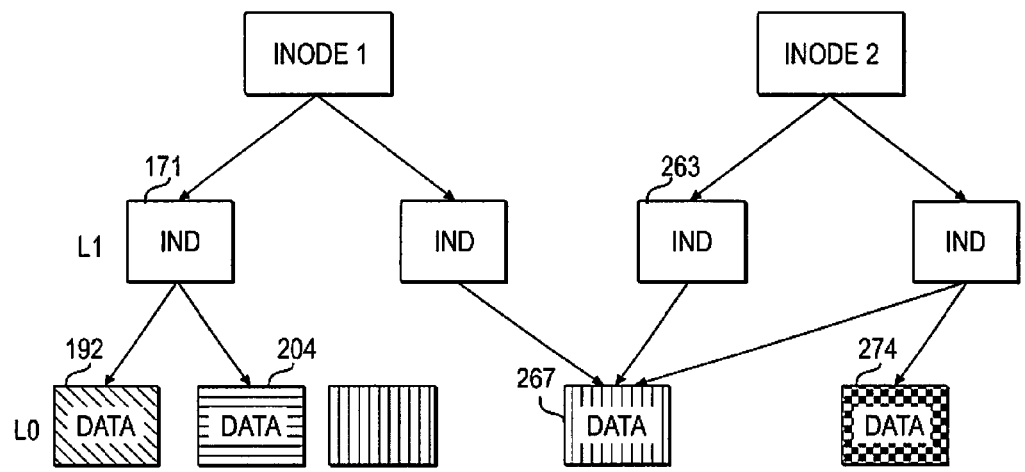

Now consider the process of deduplication. FIGS. 5A and 5B show an example of the buffer trees of two files, where FIG. 5A shows the buffer trees before deduplication and FIG. 5B shows the buffer trees after deduplication. The root blocks of the two files are Inode 1 and Inode 2, respectively. The three-digit numerals in FIGS. 5A and 5B are the PVBNs of the various blocks. The fill patterns of the direct (L0) blocks in these two figures represents the data content of those blocks, such that blocks shown with identical fill pattern are identical data blocks. It can be seen from FIG. 5A, therefore, that the data blocks with PVBNs 294, 267 and 285 are identical.

The result of deduplication is that these three data blocks are, in effect, coalesced into a single data block, identified by PVBN 267, which is now shared by the indirect blocks that previously pointed to data block 294 and data block 285. Further, it can be seen that data block 267 is now shared by both files. In a more complicated example, data blocks can be coalesced so as to be shared between volumes or other types of logical containers. Note that this coalescing operation involves modifying the indirect blocks that pointed to data blocks 294 and 285, and so forth, up to the root node. In a write out-of-place file system, that involves writing those modified blocks to new locations on disk.

To identify duplicate data blocks, a hash function, such as MD5, SHA-256 or SHA-512, can be applied to all used (unfree) data blocks in the data set to be deduplicated. The output of the hash function is a value for each data block, called a fingerprint, where identical data blocks will always have the same fingerprint. By comparing the fingerprints during a subsequent deduplication process, potential duplicate data blocks can be identified (data blocks with identical fingerprints are potential duplicates). Once potential duplicate data blocks are identified, a byte-by-byte comparison can be done on those data blocks to identify actual duplicates, which can then be coalesced. Because the fingerprint of a block is much smaller than the data block itself, fingerprints for a very large number of data blocks can be stored without consuming a significant portion of the storage capacity in the system.

Beyond the fact that deduplication is performed from time to time in the source storage system, the particular time and manner in which deduplication is performed are not germane to the technique introduced here and need not be discussed herein.

Figure 6:
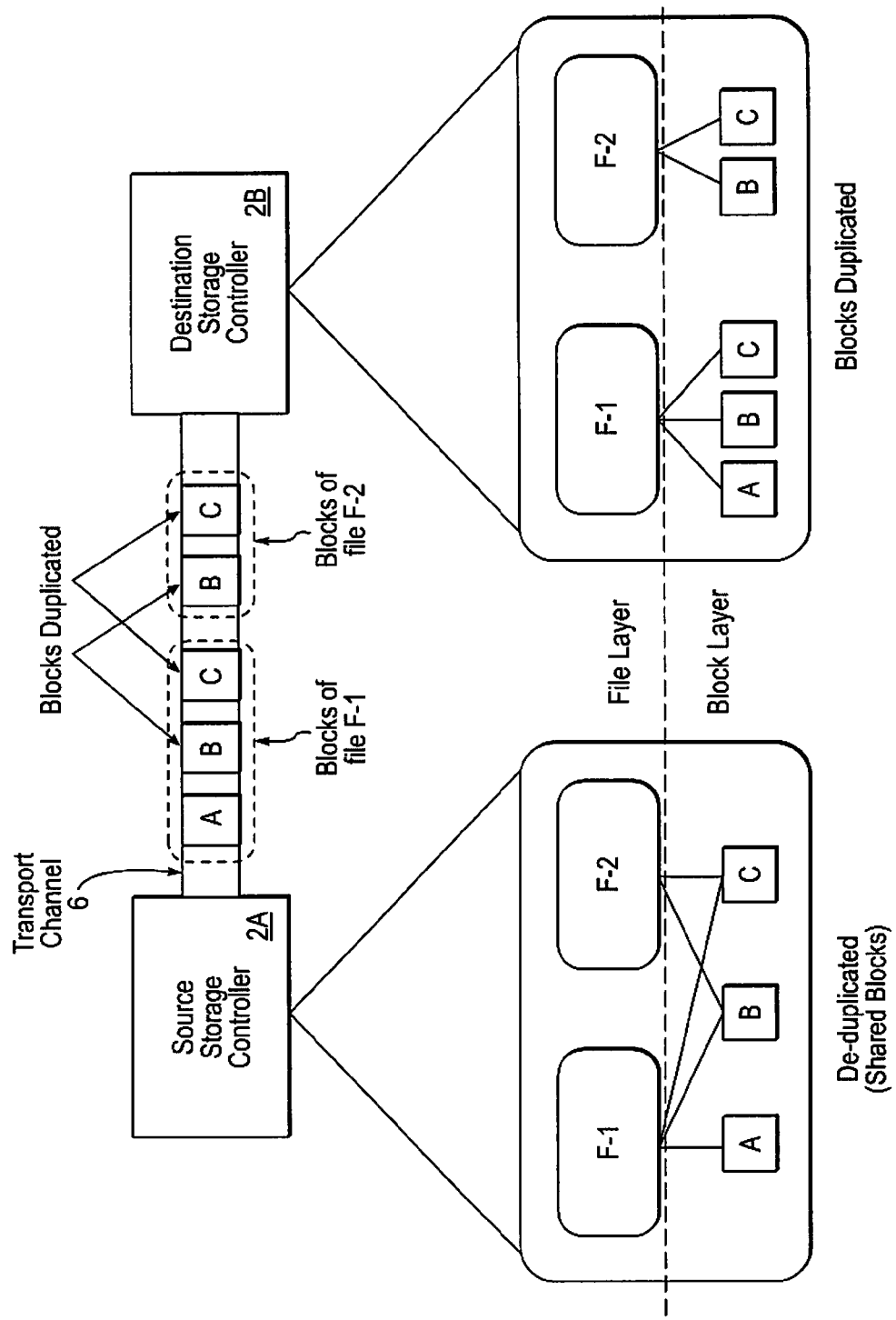
FIG. 6 illustrates repeated transmission of identical data blocks from a source to a destination when deduplication is used with logical block mirroring without employing the technique being introduced here.

FIG. 6 illustrates an example of what can happen when deduplication such as described above is used with logical block mirroring, without employing the technique being introduced here. When deduplication is performed at the source storage system, duplicate blocks in a volume are removed and files share blocks that have the same content. This characteristic is illustrated in FIG. 6 as the files F-1 and F-2 sharing data blocks B and C. The SMA 8A in the source storage controller 2A reads logical blocks and is agnostic of the use (or non-use) of deduplication at the source storage system. When the SMA requests to read a data block from the source filesystem (such as when preparing to send a block to the destination during a mirror update), it does so in the context of a particular file (by referring to the file's inode). Thus, during mirroring from the source to destination, the SMA in the illustrated example will send block B and block C first for file F-1, and then again for file F-2. This results in these blocks being duplicated over the connection between the source and the destination. Furthermore, if the destination does not implement in-line deduplication, these (now duplicate) data blocks will be written to storage at the destination, resulting in the volume at the destination storage system having duplicate blocks. To gain back the space savings achieved at the source by deduplication, deduplication would now have to be explicitly scheduled at the destination storage system.

Contrast the above with the technique introduced here: With the technique introduced here, data blocks are not sent more than once over the connection between the source and the destination. Moreover, with this technique the SMA does not even have to read any data block more than once during a mirror update, thus reducing the processing load on the source storage system.

At a high-level, the technique introduced here can be thought of as follows: First, calculate some kind of a hash value (e.g., fingerprint) for each data block at the source, and then, send only the hash values (initially, at least) from the source to the destination. Only if the destination does not have that particular hash is the entire data block sent.

In reality, there is no such thing as a perfect hash. Consequently, it is possible, though unlikely, that two different data blocks could produce the same hash value; such a situation is called a collision. The technique introduced here deals with this problem, in certain embodiments, by using a data block's PVBN as a unique ID for that block, as a substitute for a hash value. Every PVBN is, by definition, unique within an aggregate. As long as deduplication does not have to be done across multiple aggregates at the source, the source PVBN will suffice for this purpose. In other embodiments, a block's VVBN is instead used as its unique ID (which is possible, because there is a one-to-one mapping between each PVBN and a VVBN).

The destination storage system maintains a persistent data structure, called a history buffer, for each destination data set that is to be replicated (e.g., a qtree). This data structure has an entry that identifies a destination PVBN (d_pvbn) and a destination snapshot identifier (snap_id) pair for each given source PVBN (s_pvbn). The history buffer also includes a reference count for each entry, indicating how many references (pointers) there are in the destination storage system to the corresponding data block. The reference count is used to ensure that an entry in the history buffer is not deleted or invalidated as long as the corresponding data block is still being referenced by at least one buffer tree in a destination storage system (i.e., as long as its reference count is greater than zero). In at least one embodiment the history buffer is a sparse array indexed by source PVBN and contains the destination PVBN, if the block has been previously received by the destination storage system. If the destination PVBN slot for a given source PVBN is empty, then the source storage system has never sent this block the destination storage system.

During a mirror baseline or update operation, the SMA first sends a reference to a block to the DMA, in terms of the block's source PVBN (i.e., its PVBN in the source storage system's aggregate). The information sent by the source to the destination for any given data block includes: 1) the file identifier (ID) (e.g., inode number) of the file for which a block is being sent; 2) the FBN of the block within the file; 3) s_pvbn—the source PVBN of the block corresponding to that FBN, as modified; and 4) s_pvbn_old—the source PVBN of the block before the latest snapshot.

If an entry cannot be found in the history buffer corresponding to the source PVBN, it implies that the destination does not have data for that block (or the snapshot that contained the block has been deleted). The DMA will then explicitly request the SMA to send the data block corresponding to that source PVBN.

When the SMA sends a block reference to the destination, it is possible that the destination storage system has since freed that block due to snapshot deletion. In such a case, the DMA will request that specific block from the source. Note that the old PVBN of the block, s_pvbn_old, is sent to the destination so that the corresponding entry for the old PVBN can be invalidated in the history buffer.

Figure 7:
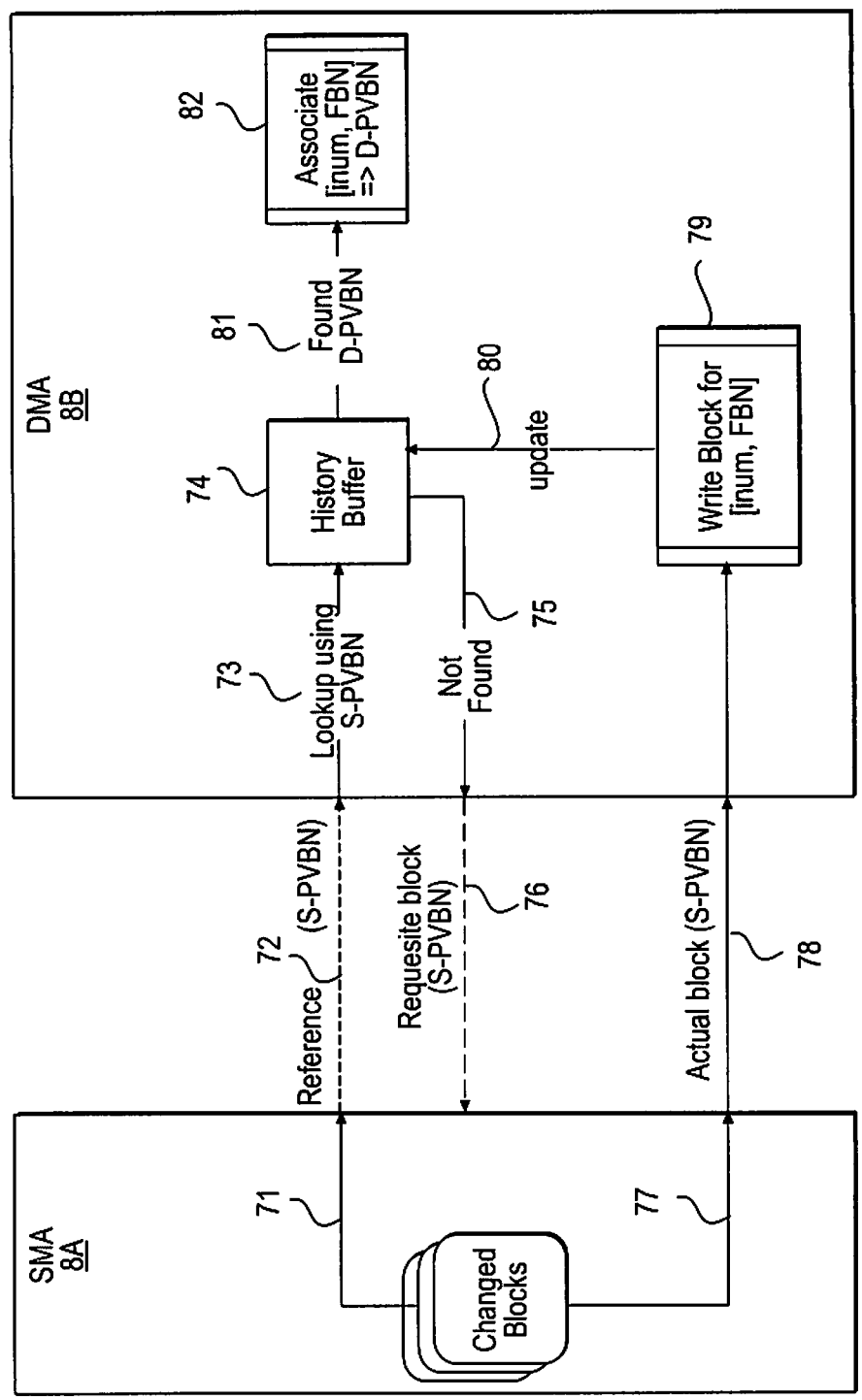
FIG. 7 illustrates a technique for logical block mirroring with deduplication.

The technique will now be further described with reference to FIG. 7. FIG. 7 illustrates a process of performing a mirroring update. Initially, at step 71 the SMA 8A determines which blocks have been modified since the last update (or baseline, if this is the first update). The SMA 8A then sends a reference of the type mentioned above to the DMA for each modified block, at step 72. The DMA 8B at step 73 then performs a look-up in its history buffer 74, using the source PVBN, s_pvbn, provided in the received block reference.

If a valid entry is found for the source PVBN in the history buffer 74 (step 81), this means that the destination storage system already has the modified block stored. In that case, at step 82 the DMA 8B looks up the destination PVBN, d_pvbn, associated with the source PVBN, and then causes the destination filesystem to associate the received FBN and its inode number with that d_pvbn, for future reference. The destination mirroring also increments by one the reference count for that block in the history buffer. The DMA then clears the old entry for that block history buffer, i.e., the entry indexed by s_pvbn_old.

If, on the other hand, a valid entry is not found for that source PVBN in the history buffer 74 (step 75), this means that either the block was never sent from the source to the destination, or the snapshot that contained the block has been deleted at the destination. Regardless, in this situation the DMA 8B sends a request for that block at step 76 (including the source PVBN as a parameter in the request) to the SMA 8A. The SMA 8A responds to the request by requesting a read of that block from the local filesystem. When the data block is returned by the source filesystem at step 77, the SMA 8A sends the actual data block to the DMA 8B at step 78.

The DMA 8B responds to receipt of the data block by causing the destination filesystem to write that block to storage in the destination storage system at step 79. This includes associating the block with a file (inode number) on the destination storage system and determining the block's PVBN in the destination storage system's aggregate, i.e., the destination PVBN (d_pvbn). The DMA 8B then updates the history buffer 74 to include an entry that associates the destination PVBN, dpvbn, with the source PVBN, s_pvbn.

Note that certain contents of the history buffer should be invalidated as blocks become unused in the destination storage system. There are three situations when blocks can become unused at the destination: snapshot deletion, block invalidation and file deletion.

The possibility of snapshot deletion on the destination storage system exists independent of the source storage system. This scenario can be handled by the DMA rejecting the references that the SMA sends to those blocks that no longer exist at the destination. If the DMA rejects a reference, the SMA will then have to send the complete block. When this happens, the DMA will purge that entry from the history buffer. Specifically, the DMA will compare the snap_id in the history buffer corresponding to a given s_pvbn and delete the entry in the history buffer if the identified snapshot does not exist anymore at the destination storage system.

Entries in a history buffer can also become invalid due to FBNs at the source being overwritten with new data. All such entries need to be purged from the history buffer. To assist in this, the SMA can provide the PVBN of the block in the base snapshot with its PVBN in the incremental snapshot (update). A reference count is maintained for each entry in the history buffer. For every PVBN in the base snapshot, the corresponding entry in the history buffer is un-referenced, such that eventually the entry is cleared when the reference count reaches zero.

For files that have been deleted, the SMA will send the "holes", i.e., the references to all of the deleted data blocks, for the entire file to the DMA. This is done so that the DMA can unreference the s_pvbn_old entries from the history buffer.

Thus, a method and apparatus for performing deduplication in conjunction with logical mirroring have been described. The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    storing at a source storage system a set of data that includes a plurality of data blocks, each of the data blocks being identified by a logical block pointer;
    deduplicating the data blocks in the set of data at the source storage system so that at least one of the data blocks is represented by at least two different logical block pointers; and
    replicating the data blocks in the set of data from the source storage system to a destination storage system at a logical block level corresponding to the logical block pointers, including sending the at least one data block represented by the at least two different logical block pointers from the source storage system to the destination storage system without transmitting any data block in the data set more than once from the source storage system for delivery to the destination storage system.

2. A method as recited in claim 1, wherein each of the data blocks of the data set is further identified by a physical block pointer.

3. A method as recited in claim 1, wherein said replicating comprises:
    identifying a data block that is to be replicated from the source storage system to the destination storage system;
    determining a reference to the data block in the source storage system, the reference being unique to the data block within a storage aggregate of the source storage system;
    sending the reference to the destination storage system; and
    using the reference at the destination storage system to determine whether the destination storage system already has the data block stored, wherein the data block is not sent from the source storage system to the destination storage system if the destination storage system already has the data block stored.

4. A method as recited in claim 3, wherein using the reference at the destination storage system comprises:
    using the reference to perform a lookup in a data structure at the destination storage system, the data structure containing a mapping of source storage system block references to destination storage system block references.

5. A method as recited in claim 3, further comprising:
    using the reference at the destination storage system to identify a corresponding data block that the destination storage system already has stored.

6. A method as recited in claim 3, further comprising:
    if the destination storage system does not already have the data block stored, sending a request from the destination storage system to the source storage system, for the source storage system to send the data block to the destination storage system.

7. A method as recited in claim 3, wherein the reference comprises a physical block pointer.

8. A method as recited in claim 3, wherein the reference comprises a virtual block pointer which has a one-to-one correspondence to a physical block pointer.

9. A method as recited in claim 8, wherein the virtual block pointer is different from the logical block pointers.

10. A method as recited in claim 1, wherein said replicating comprises:
    performing an incremental backup by transmitting modified data blocks from the source storage system to the destination storage system without transmitting any data block more than once from the source storage system for delivery to the destination storage system.

11. A method as recited in claim 1, wherein said replicating comprises:
    determining a first reference to a first data block as stored in the source storage system, the first reference being unique to the first data block within a defined storage aggregate;
    sending the first reference and a logical block pointer of the first data block from the source storage system to the destination storage system;
    at the destination storage system,
        determining whether the destination storage system already has stored the first data block, by using the first reference to perform a lookup in a data structure; and
        in response to determining that the destination storage system already has stored the first data block,
            identifying in the data structure a second reference to the first data block as stored in the destination storage system, and
            associating the second reference with the logical block pointer of the first data block.

12. A method as recited in claim 11, wherein said replicating comprises:
    determining a second reference to a second data block as stored in the source storage system, the second reference being unique to the second data block within the defined storage aggregate;
    sending the second reference and a logical block pointer of the second data block from the source storage system to the destination storage system;
    at the destination storage system,
        determining whether the destination storage system already has stored the second data block, by using the second reference to perform a lookup in the data structure; and
        in response to determining that the destination storage system does not already have the second data block stored,
            sending a request, from the destination storage system to the source storage system, for the source storage system to send the second data block to the destination storage system, receiving the second data block at the destination storage system from the source storage system, storing the second data block at the destination storage system, and updating the data structure to include a mapping between the second reference and a third reference to the data block as a stored in the destination storage system.

13. A method comprising:

(a) storing at a source storage system a set of data that includes a plurality of data blocks, each of the data blocks being identified by a physical block pointer and a logical block pointer;

(b) deduplicating the data blocks in the set of data at the source storage system at a physical block level, so that at least one of the data blocks is represented by at least two different logical block pointers; and (c) replicating the data blocks in the set of data from the source storage system to a destination storage system at a logical block level corresponding to the plurality of logical block pointers, wherein said replicating includes (c)(1) at the source storage system, (c)(1)(A) identifying one or more of the data blocks in the data set that have been modified at the source storage system;

(c)(1)(B) for each data block identified as having been modified, determining a first reference to the data block as stored in the source storage system, the first reference being unique to said data block within a storage aggregate of the source storage system; and (c)(1)(C) sending each said first reference and a corresponding logical block pointer from the source storage system to the destination storage system;

(c)(2) at the destination storage system, (c)(2)(A) for each said first reference, determining whether the destination storage system already has stored the corresponding data block, by using the first reference to perform a lookup in a data structure at the destination storage system to determine whether the data structure has an entry that includes said first reference, the data structure containing a mapping of source storage system block references to destination storage system block references;

(c)(2)(B) in response to determining that the data structure has an entry that includes the first reference, (c)(2)(B)(i) identifying in the entry a second reference to a data block stored in the destination storage system, and (c)(2)(B)(ii) associating the second reference with the logical block pointer of said corresponding data block; and (c)(2)(C) in response to determining that the data structure does not have an entry that includes the first reference, (c)(2)(C)(i) sending a request, from the destination storage system to the source storage system, for the source storage system to send the corresponding data block to the destination storage system, (c)(2)(C)(ii) receiving the corresponding data block at the destination storage system from the source storage system, (c)(2)(C)(iii) storing the corresponding data block at the destination storage system, and (c)(2)(C)(iv) updating the data structure at the destination storage system to have an entry that includes a mapping between the first reference and a second reference to the data block as stored in the destination storage system.

14. A method as recited in claim 13, wherein each said first reference comprises one of the physical block pointers.

15. A method as recited in claim 13, wherein each said first reference comprises a virtual block pointer corresponding to one of the physical block pointers, and wherein each of the physical block pointers corresponds to exactly one of the virtual block pointers.

16. A method as recited in claim 15, wherein the virtual block pointers are different from the logical block pointers.

17. A data mirroring system comprising:

a source storage system including
 a source non-volatile storage facility to store a set of data that includes a plurality of data blocks, each of the data blocks being identified in the source storage system by a physical block pointer and a logical block pointer,
 a source deduplication engine to deduplicate the data blocks in the set of data at the source storage system so that at least one of the data blocks is represented by at least two different logical block pointers, and
 a source replication engine to identify a data block that is to be replicated at a logical level and to determine a reference to the data block in the source storage system, the reference being unique to the data block within a storage aggregate of the source storage system; and a destination storage system including
 a destination non-volatile storage facility to store a mirror of the set of data, and
 a destination replication engine to receive the reference from the source storage system, and to use the reference to determine whether the destination storage system already has the data block stored, wherein the destination replication engine requests the data block from the source storage system if the destination storage system does not already have the data block stored but does not request the data block if the destination storage system already has the data block stored.

18. A data mirroring system as recited in claim 17, wherein the destination replication engine uses the reference to perform a lookup in a data structure maintained by the destination storage system, the data structure containing a mapping of source storage system block references to destination storage system block references.

19. A data mirroring system as recited in claim 17, wherein the destination replication engine uses the reference to identify a corresponding data block that the destination storage system already has stored.

20. A data mirroring system as recited in claim 17, wherein the reference comprises one of the physical block pointers.

21. A data mirroring system as recited in claim 17, wherein the reference comprises a virtual block pointer corresponding to one of the physical block pointers, and wherein each of the physical block pointers corresponds to exactly one of the virtual block pointers.

22. A data mirroring system as recited in claim 21, wherein the virtual block pointers are different from the logical block pointers.

23. A destination storage system comprising:

a processor;

a network interface through which the destination storage system can communicate with a source storage system;

a storage facility to mirror a set of data on the source storage system; and a memory storing instructions which, when executed by the processor, cause the destination processing system to perform a process of replicating data at a logical level from the source storage system to the destination storage system, the process including receiving from the source storage system a reference to a data block to be replicated from the source storage system to the destination storage system, the reference being unique to the data block within a storage facility of the source storage system; and using the reference to determine whether the processing system already has the data block stored by performing a lookup in a data structure at the destination storage system, the data structure containing a mapping of source storage system block references to destination storage system block references, wherein the data block is not sent from the source storage system to the destination storage system if the destination storage system already has the data block stored.

24. A destination storage system as recited in claim 23, wherein the data block is identified in the source storage system by a physical block pointer and a plurality of different logical block pointers.

25. A destination storage system as recited in claim 23, wherein the process of replicating data further comprises:

using the reference at the destination storage system to identify a corresponding data block that the destination storage system already has stored.

26. A destination storage system as recited in claim 23, wherein the process of replicating data further comprises:

if the destination storage system does not already have the data block stored, sending a request from the destination storage system to the source storage system, for the source storage system to send the data block to the destination storage system.

27. A destination storage system as recited in claim 23, wherein the reference comprises a physical block pointer.

28. A destination storage system as recited in claim 23, wherein the reference comprises a virtual block pointer.

* * * * *